UNITED STATES PATENT OFFICE.

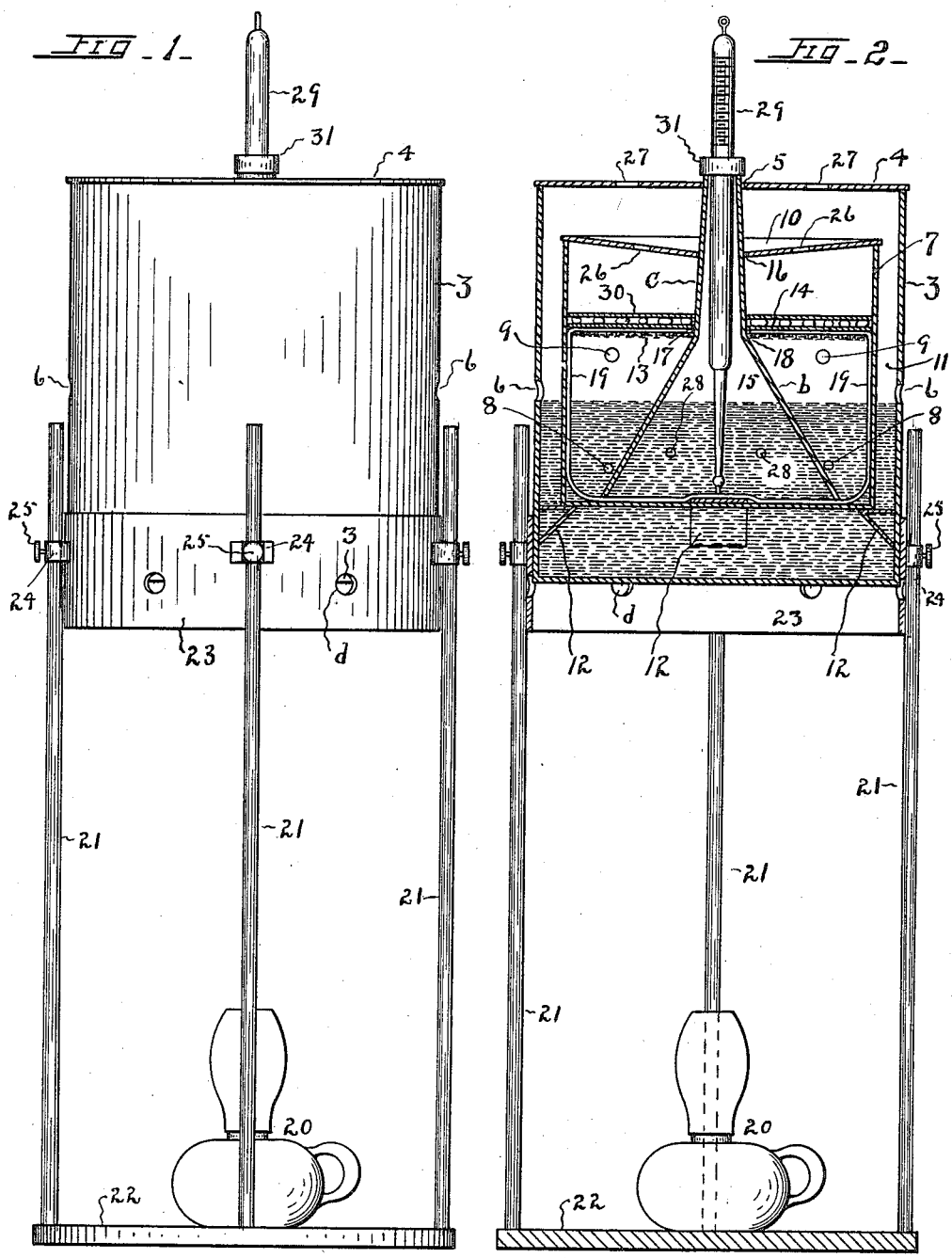

HARRY G. COY, OF WATERLOO, NEBRASKA.

SEED-GERMINATION-TESTING DEVICE.

1,045,816.   Specification of Letters Patent.   Patented Dec. 3, 1912.

Application filed February 19, 1912. Serial No. 678,697.

*To all whom it may concern:*

Be it known that I, HARRY G. COY, a citizen of the United States, residing at Waterloo, in the county of Douglas and State of Nebraska, have invented certain new and useful Improvements in Seed-Germination-Testing Devices, of which the following is a specification.

This invention has for its object to provide a device which will be effective for testing seed corn, grain or the like, to ascertain their germinating qualities, said device to consist of few and simple parts so that it may be economically manufactured, and will be convenient in use.

The invention consists of the novel construction, combination and arrangement of parts as described herein and claimed, and as illustrated in the drawing, it being understood that changes in form, size, proportion and minor details may be made within the scope of the claims, without departing from the spirit of the invention or sacrificing any of its advantages.

In the drawing, Figure 1 is a side elevation of the testing device. Fig. 2 is a view of the same in longitudinal section.

Referring now to the drawing for a more particular description, numeral 3 indicates an upright container, preferably having a cover 4 centrally apertured as indicated at 5; and in the side wall of the container, preferably opposite to each other, are formed the apertures 6, operating as exit ports for water and intakes for air.

At 7 is indicated a receptacle having apertures 8 formed near its bottom in its upright wall, apertures 9 also being provided in its upright wall between its cover 10 and apertures 8. The container and receptacle are preferably of cylindrical form and adapted to contain water or other vapor-producing liquid, the diameter of receptacle 7 being less than that of the container to form, between their side walls, the annular chamber 11 when the receptacle 7 is placed within container 3; and any suitable means may be employed for supporting the receptacle removably within the container so that the bottom of the receptacle 7 will be maintained above the bottom of container 3, the means herein shown being brackets 12 secured upon the inner wall of said container.

When the parts are disposed as last described, they may be partly filled with water, but no higher than apertures 6; and on account of the confined water, a certain quantity of vapor will be formed therein; and if the temperature of the water is increased, the amount of vapor, of course, will be comparatively greater.

To provide a convenient deposit for grain or seed-corn, so that it may be readily examined whenever required, and will be exposed to, substantially, a uniform temperature and quantity of vapor, I provide a further arrangement of parts which will be described in detail.

At 13 is indicated a platform of disk-shape, preferably constructed of wire gauze, and upon this platform may be placed a layer 14 of absorbent material, as blotting-paper or the like, for the deposit thereon of the seed, these parts being sustained horizontally by the downwardly divergent or flaring wall $b$ of the support 15, said support preferably having the shape of an inverted funnel, or cone-shaped; and central apertures 16, 17 and 18 may be formed, respectively, in cover 10, the absorbent layer, and in the wire gauze, so that the upwardly-projecting spout or stem $c$ of member 15 may traverse these parts.

By means of the construction, water being employed as described, and without employing any other parts for the device, the absorbent layer would become moist from exposure to the vapor after a certain lapse of time, and the moisture would be sufficient for the germination of the seed, but by use of fabric strips 19 a greater quantity of moisture may be provided. Strips 19 may be disposed upon the bottom of receptacle 7, and funnel 15 may rest thereon. The fabric strips may be extended upwardly to lie upon the wire gauze, and when thus arranged, water will be conducted by capillary attraction in a manner to saturate layer 14, and thereby adequately supply the seed with moisture.

It will be seen that if receptacle 7 is disposed substantially midway between the upright sides of container 3 the annular chamber 11 will be of a uniform width, and the construction provides for this feature, since covers 4 and 10 at their respective apertures 5 and 16 engage the cone-shaped support 15 while the bottom of receptacle 7 rests upon the brackets 12, and the receptacle may therefore be maintained midway between the sides of the container.

In practice, the container 3 and parts disposed therein may be kept in any location where the temperature is uniform and moderately warm, and if supported in an upright position, the device will be fully operative to cause the germination of seed corn or other seed in the usual period of time required. However, since the germinating quality of seed and especially seed corn is often tested in cold weather, certain means are provided for causing uniformity of temperature, both of air and water, so that germination of the seed may be effective and that the testing may be reliable.

At 20 is indicated a heating agent or lamp, and any suitable means may be arranged so that the container 3 and parts therein may be held or suspended thereabove, the means herein shown being a plurality of parallel rods or guides 21, their lower terminals being secured to a flat base 22. At 23, slidably mounted upon the lower part of container 3, is indicated a sleeve or hood of flexible material; this sleeve or hood may be constructed of such a diameter that the weight of the container will be sustained by said sleeve when mounted therein on account of the contact of their surfaces; said member 23 is preferably formed with apertures $d$, and bears upon its wall, at points opposite to each other the holders, clasps or brackets 24. By inserting rods 21 in the brackets, the container 3 and parts carried thereby may be disposed at a suitable distance, adjustably, above the lamp 20, set-screws 25 being employed to secure the parts in fixed or rigid relation. If the weather is extremely cold, the container may be lowered nearer to the lamp; and also the hood may be lowered upon the container to provide a greater area of heated space immediately below the container; and these adjustable features are very useful for controlling the temperature.

The device provides a comparatively inexpensive article for testing the germinating quality of seeds; it occupies only a limited space, and it is very convenient in use. By this construction a thorough ventilation is provided. It will be seen that apertures 9 are formed at such a distance above apertures 8 that when the bottom of container 7 is disposed upon brackets 12, said apertures 9 will be disposed above the water. Air may pass inwardly through apertures 6 to the annular chamber 11, and from thence may pass through apertures 9 within that part of container 7 below the wire gauze 13. Cover 10 is provided with apertures 26, and air may pass therethrough within that part of receptacle 7 above the seed; and air may pass through apertures 27 of cover 4.

It will be noted that the construction provides for a circulation of air and vapor, both above and below the platform of the seed-deposit, and this feature is considered to be of advantage.

Cover 10 is preferably formed with a downward and inward inclination for a bearing upon the spout $c$, and water which may be condensed and may form upon its lower surface will thereby be conducted to the spout, and from thence to the middle part of the absorbent paper, to be equally distributed to the seed.

At 28 are indicated apertures formed in the flaring portion $b$ of the funnel-shaped support 15, and water may freely circulate therein and may move through apertures 8 of the inner receptacle. Only a slight degree of heat is required to produce vaporization of the water, and by means of the adjustable features as described a suitable temperature may be maintained. The spout $c$ provides a suitable housing for a thermometer 29, and by its use the operator may be guided, and may avoid the production of an excessive degree of heat, and may maintain a suitable temperature. At 30 is indicated an additional or upper layer of absorbent material, and it may be laid upon the seed corn or seed which is to be tested. A collar 31, preferably of rubber, may be employed for supporting the thermometer upon the upper end of member 15.

It will be noted that all of the parts are removably connected. Member 15 and parts supported thereby may be removed simply by elevating or raising it from receptacle 7; and covers 4 and 10, together with the wire gauze and absorbent layers, may be readily separated from the support 15, and these features are desirable for purposes of cleaning.

Having fully described the several parts and their uses, a further explanation relating to operation is not necessary.

What I claim as my invention and desire to secure by Letters Patent is,—

1. A testing device of the class described, comprising, in combination with a support a liquid container having means for vertical adjustment with reference to the support, and provided with an overflow aperture; an apertured receptacle supported within the container to provide between its side wall and the side wall of the container an annular chamber, an apertured cover for the receptacle; a seed-platform; and means to support the seed-platform within the container in a horizontal plane between said cover and over-flow aperture.

2. A testing device of the class described, comprising, in combination with a cylindrical container having apertures formed in its upright wall at substantially uniform distances from its bottom, a cylindrical receptacle disposed within the container and having apertures formed in its upright wall; a wire-gauze platform disposed within the receptacle; a supporting member of substantially cone-shape disposed within the receptacle and traversing the wire-gauze; an absorbent layer disposed upon the platform; and means to maintain the receptacle with its bottom disposed adjacent to and above the bottom of the container.

3. A testing device of the class described, comprising, in combination, a platform for supporting the seed, a heating-member, a water-container, adjustable means for supporting the container at various distances above the heating member, and means for supporting the platform horizontally within the container.

4. A testing device of the class described, comprising a liquid-container having an upright wall formed with apertures and provided between said apertures and its bottom with brackets; an apertured receptacle adapted to be removably seated upon said brackets to form between its upright wall and the upright wall of the container a continuous chamber; a supporting-member of substantially cone-shape disposed within the receptacle; and an apertured platform for the deposit thereon of seed, said platform being disposed within the receptacle in the horizontal plane of the continuous chamber and maintained by the supporting-member while traversed thereby.

5. A testing device of the class described, comprising, in combination with a support, upright guides mounted thereon, a hood vertically adjustable upon the guides; a container having an upright wall formed with overflow apertures and adapted to be adjusted vertically while mounted in said hood; a seed-platform comprising a layer of woven wire with an overlay of absorbent material; said platform being disposed horizontally within the container above the overflow aperture.

6. A testing device of the class described, comprising, in combination with a container having an upright, apertured wall; a receptacle having an upright, apertured wall; a seed-platform comprising a layer of woven wire with an overlay of absorbent material, said receptacle adapted to be disposed within the container with its bottom disposed adjacent to the bottom of the container; means to support the seed-platform within the receptacle in a horizontal plane above the apertures of the container and receptacle; an apertured cover for said receptacle, and an apertured cover for said container.

7. A tester of the class described, comprising a cylindrical container having oppositely disposed apertures formed in its side wall, a cylindrical receptacle adapted to be removably disposed within the container to form an annular chamber between its side wall and the side wall of the container; an upwardly-convergent support removably disposed within the receptacle; a seed-platform within the receptacle removably mounted upon the wall of the support; and an apertured cover inclined downwardly and inwardly for bearings upon the side walls of the receptacle and the support, the seed-paltform being disposed in a horizontal plane above the apertures of said container.

In testimony whereof I have affixed my signature in presence of two witnesses.

HARRY G. COY.

Witnesses:
  ROBERT R. KELLETT,
  HENRY E. KELLETT.

---

Copies of this patent may be obtained for five cents each, by addressing the " Commissioner of Patents, Washington, D. C."